United States Patent [19]

Stoken

[11] Patent Number: 5,039,848
[45] Date of Patent: Aug. 13, 1991

[54] METHOD AND MACHINE FOR DISPENSING COUPONS

[75] Inventor: Raymond G. Stoken, Irwin, Pa.

[73] Assignee: Audio-Visual Concepts, Inc., North Huntingdon, Pa.

[21] Appl. No.: 328,046

[22] Filed: Mar. 23, 1989

Related U.S. Application Data

[63] Continuation-in-part of Ser. No. 64,210, Jun. 19, 1987, abandoned.

[51] Int. Cl.$^5$ .............................................. G06B 7/08
[52] U.S. Cl. ..................................... 235/381; 194/217
[58] Field of Search ....................... 194/216, 217, 218; 221/2, 3, 7, 8; 40/444, 550; 235/381, 380, 375, 383, 385, 487; 364/479

[56] References Cited

U.S. PATENT DOCUMENTS

| Re. 32,115 | 4/1986 | Lockwood et al. | 194/217 |
| 4,124,109 | 11/1978 | Bissel et al. | 194/4 |
| 4,674,041 | 6/1987 | Lemon et al. | 235/381 X |
| 4,825,045 | 4/1989 | Humble | 235/383 |
| 4,833,308 | 5/1989 | Humble | 235/383 |
| 4,882,675 | 11/1989 | Nichtberger et al. | 235/381 X |
| 4,896,791 | 1/1990 | Smith | 221/7 |
| 4,910,672 | 3/1990 | Off et al. | 235/383 |

FOREIGN PATENT DOCUMENTS 2192180  1/1988  United Kingdom ................ 221/2

Primary Examiner—Kevin P. Shaver
Attorney, Agent, or Firm—James L. Sherman

[57] ABSTRACT

A machine is for selectively dispensing a plurality of coupons including at least two different inscriptions thereon to be respectively redeemable for at least two different promotions or bargains. The machine includes a cabinet and a display area on the cabinet indicating the different bargains capable of being acquired by redemption of the respective coupons and a specific amount of money required to obtain each respective coupon. Selection buttons mounted on the cabinet are used to select a desired one of the different bargains and the respective coupon therefor. A coin slot and collection box in the cabinet are used to receive various amounts of money. The coupons are stored in the cabinet and are aligned with a coupon dispenser which is capable of dispensing each coupon to the exterior of the cabinet through a slot. A printed circuit board in the cabinet electrically coupled to all of the components includes control circuitry which is capable of determining that the desired one of the different bargains selected by the buttons and that the amount of money for the desired one of the different bargains as selected has been deposited in the coin slot and collection box. The control circuitry then causes the coupon dispenser to dispense the respective coupon for the desired one of the different bargains.

18 Claims, 3 Drawing Sheets

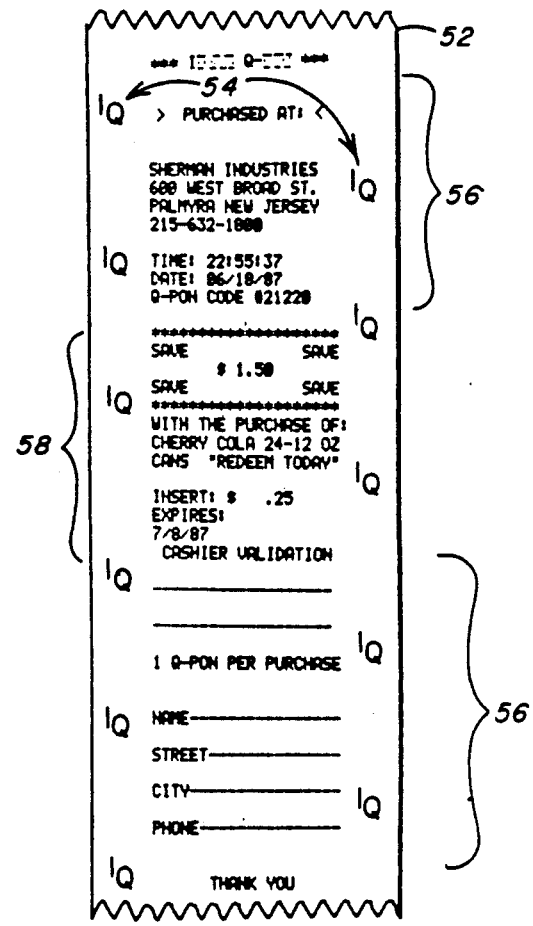
FIG. 3
FIG. 5
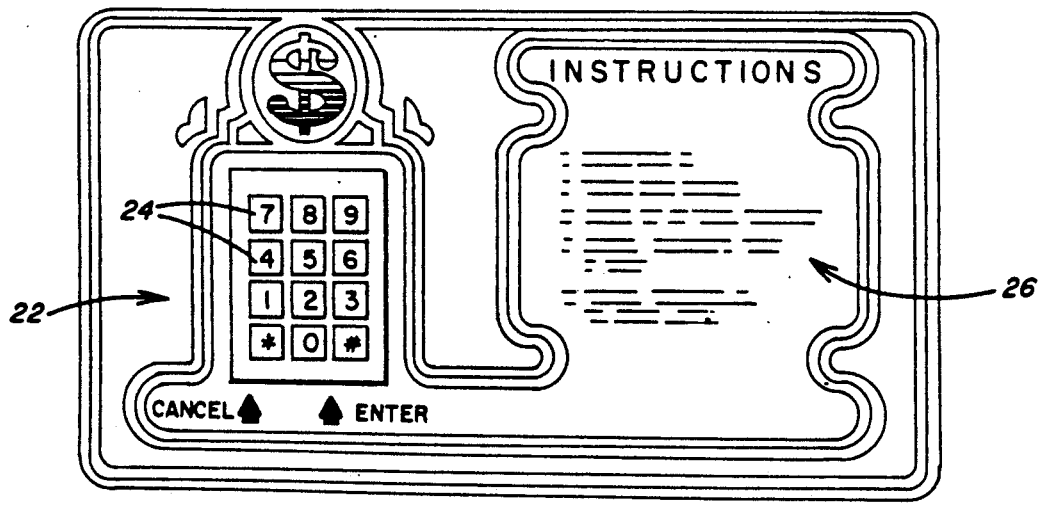
FIG. 4

METHOD AND MACHINE FOR DISPENSING COUPONS

This is a continuation-in-part of U.S. patent application Ser. No. 064,210 filed June 19, 1987, now abandoned.

BACKGROUND OF THE INVENTION

1. Field of the Invention

This invention relates to a machine which is capable of being utilized to selectively dispense different coupons which can be redeemed for different bargains and to the method of dispensing such coupons.

2. Description of the Prior Art

The use of coupons to promote various products and services is well known in the business community. Coupons often appear in magazines and newspapers and are offered to interested customers buying or reading the magazine or newspaper to cut out and redeem for various products or services. Obviously, the percentage of readers that specifically read and/or use such coupons is so small that the cost of printing and advertising must be critically analyzed to see if it is justified in light of the possible response. Similarly, coupons are often sent to potential customers through the mail. Business concerns spend a great amount of money and effort trying to acquire, select and refine mailing lists to insure that the benefits and response sought will be as great as possible in view of the cost of printing and postage.

For both coupons through the mail and in publications, the overall cost is usually borne by the business or organization offering the coupon. However, some businesses and organizations have employed a system which tends to reduce the cost by reducing the number of potential customers and to further defray the cost by requiring the customer to pay for the coupons. For example, a car washing business may offer a coupon book to customers for ten dollars which includes coupons which can be redeemed for a number of car washes which would otherwise cost twenty dollars. Similarly, some independent organizations have contracted with various restaurant, hotel and entertainment businesses to produce coupon books that are sold to customers who may or may not then take advantage of a large number of coupons redeemable at the contracting businesses. The coupons often include two items or services for the price of one.

The business of providing coupons can include an endless number of decisions which can result in either an effective, worthless or detrimental promotional effort. Some of these decisions must be made months or years in advance. Although many large companies and manufacturers have significant experience in the promotion and use of coupons, many smaller companies and manufacturers have neither the means nor the way to determine the most effective manner to employ coupons. Clearly, any new way to provide coupons that is more flexible, at less expense and includes a greater likelihood of positive effect can be attractive to both large and small business concerns.

SUMMARY OF THE INVENTION

It is, therefore, an object of this invention to provide a machine for selectively dispensing a plurality of coupons directed to different bargains or promotions.

It is another object to provide such a machine which may require the potential customer to pay some amount of money to receive the desired coupon.

It is yet another object to provide such a machine which can be conveniently programmed or altered to provide a wide range of flexibility to insure that proper and appropriate coupons can be created and offered.

These and other objects of the invention are provided in a preferred embodiment thereof including a machine for selectively dispensing a plurality of coupons including at least two different inscriptions thereon to be respectively redeemable for at least two different bargains. The machine includes a cabinet with a display means on the cabinet including the different bargains capable of being acquired by redemption of respective coupons and a specific amount of currency required to obtain each of the respective coupons. Selection means is mounted on the cabinet for selecting a desired one of the different bargains and the respective coupon therefor. Currency deposit means is in the cabinet for receiving various amounts of currency. There is included means for storing the coupons in the cabinet and a coupon dispensing means mounted in the cabinet in alignment with the coupons stored therein which is capable of dispensing each of the coupons to the exterior of the cabinet. Control means in the cabinet is capable of determining the desired one of the different bargains selected through the selection means and the specific amount of currency for the desired one of the different bargains as selected has been deposited in the currency deposit means. The control means is also capable of then causing the coupon dispensing means to dispense the respective coupon of the desired one of the different bargains.

These and other objects of the invention are also provided by a preferred method of selectively dispensing coupons including at least two different inscriptions thereon to be respectively redeemable for at least two different bargains. The method includes displaying an indication of the different bargains and each respective coupon therefor; selecting one of the respective coupons; printing a corresponding inscription of the different inscriptions on the selected one of the respective coupons; and dispensing the selected one of the respective coupons with the corresponding inscription thereon.

BRIEF DESCRIPTION OF THE DRAWINGS

FIG. 3 is a view of a typical display screen configuration of the machine of FIG. 1.

FIG. 4 is a view of the selection panel of the machine of FIG. 1 including a typical selection button configuration and operating instructions therefor.

FIG. 5 is a view of one possible coupon which can be dispensed from the machine of FIG. 1.

DESCRIPTION OF THE PREFERRED EMBODIMENT

Figure 1:
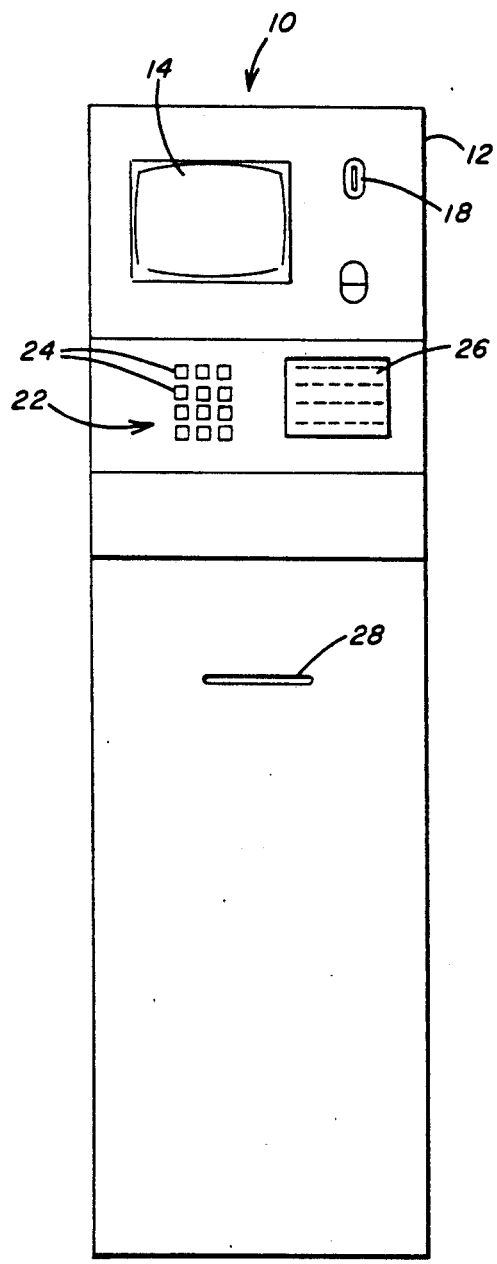
FIG. 1 is a front elevational view of the preferred machine for dispensing coupons including various features of the invention.
Figure 2:
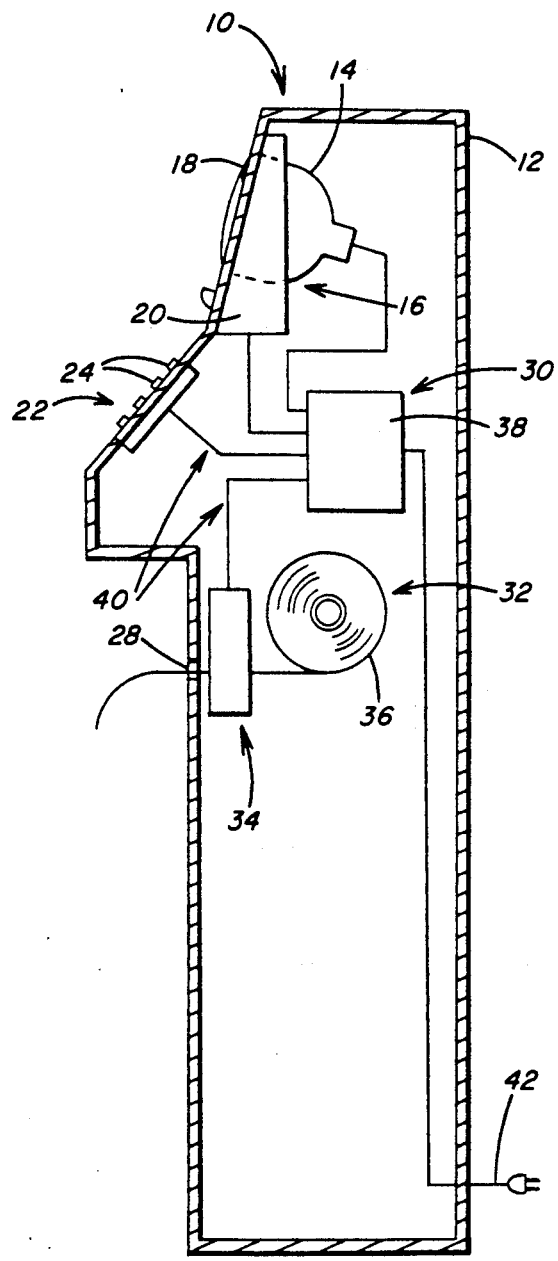
FIG. 2 is a sectional side view of the machine of FIG. 1 with the various components therein being shown in schematic form.

As seen in FIGS. 1 and 2, the preferred machine 10 for selective dispensing a plurality of coupons includes an upright cabinet 12 mounted on the floor although a counter mounted model might alternatively be employed. The cabinet 12 includes a display means preferably in the form of a video display screen 14 which can be utilized to indicate the various bargains or promotions to be offered and additional information about the coupons therefor. The cabinet 12 also includes a currency deposit means 16 in the form of a coin slot 18 and coin collecting device 20 which is well known in the video game and dispensing machine art.

To actually select a desired bargain and respective coupon from those offered, a potential customer must utilize a selection means 22 which includes an array of numbered and marked buttons 24 in the preferred machine 10 in a form similar to those on a push button telephone. Clearly, any number of other configurations could be employed for a similar purpose. In order to properly operate the buttons 24, an attached operating instructions 26 is included on the front face of the cabinet 12. After, a coupon selection is made and the proper amount of money deposited, the actual coupon will be dispensed from the cabinet 12 of the machine 10 at a slot 28 in the front panel of the cabinet 12 for removal by the customer.

As better seen in FIG. 2, the preferred machine 10 also includes control means 30 for the machine, storage means 32 for the various coupons within the cabinet 12 and dispensing means 34 for the physical movement of the coupons from the interior of the machine 10 through the slot 28 to the exterior of the cabinet 12. Although any number of coupon configurations could be stored within the machine 10 or a similar such machine, the preferred method of storing of the coupons includes the provision of a large roll 36 of coupon paper from which the specific coupons will be provided as they are dispensed. The paper of the roll 36 can be preprinted to include any type of inscription thereon including trademark information, a background design, a border design, or any other indication of the source or type of coupon being dispensed to minimize the possibility of counterfeiting or tampering which could diminish the value of the coupon system. "Blank" coupon paper is used in this manner, to allow the use of a dispensing means 34 which includes a printing means to add particular inscription thereon which is indicative of the particular coupon being selected by the customer. Again, the preferred type of dispensing means 34 which includes a small printer for individual, direct printing of a desired inscription on the surface thereof is well known in the art. For example, numerous electronic banking machines employ informational receipts which are typed with specific information about the banking transaction for the banking customer.

However, to fully utilize all of the potential of the preferred machine 10, the primary element thereof includes the control means 30. The control means 30 of the preferred machine 10 includes a printed circuit board 38 and adjoining cabling 40 to each of the other components within the cabinet 12. Power can be provided to the machine 10 from an external source 42 with the voltage being reduced to supply the various components therein. The actual form of the printed circuit board 38 and the various circuits therein depend upon the particular components being utilized in the machine 10. More significantly, a control chip of the board 38 may be programmed or programmable to give a wide range of versatility and adaptability for the entire coupon dispensing system. Again, the particular type and contents of such a control chip is outside the scope of the present invention. The design and acquisition of such control chips is well within the capability of those skilled in the computer and related arts and those having experience in numerous types of video games and dispensing machines.

For example, in one control configuration, the particular coupon dispensing machine 10 might be employed in a typical grocery store, drug store, or other similar type of business where predetermined bargains or promotions may be sought. By preprogramming numerous alternative bargains from which an owner of the machine could choose, the control circuit can allow the selector means to be temporarily used to select the specific bargains which will be displayed in the video display screen 14. When properly configured, the control means 30 will also cause the printing means within the dispensing means 34 to print a corresponding inscription on the surface of the coupon when the customer selects a particular bargain which the owner has selected for display.

In a more sophisticated, preferred configuration, the selection buttons can be utilized to create any bargain that the owner desires. The control means 30 must be configured to be programmable so that the bargains can be properly displayed and the information contained in the display can be employed in other components of the machine to insure a correspondence between the bargain and the coupon actually dispensed. In other words, the bargain which is selected would include information such as the amount of money required for the coupon and the type of redemption that is actually being ordered. When this information is used for the display, the same information is used for printing by the dispensing means and for ordering the printing and dispensing of the coupon only after a proper amount of money has been deposited in the currency deposit means 16.

Additionally, the programming of the control means 30 might and preferably would also include the ability to add additional inscriptions to the coupon which are not directly related to the particular bargain selected. For example, a timing circuitry in the printed circuit board 38 could include the time of selection by the customer and other related timing information such as an expiration date relative to the date of purchase. Still further, the control means 30 can cause the printer of the dispensing means 34 to include particular inscription which may be desired on all of the coupons dispensed regardless of the particular bargain sought. For example, the business name, address and phone number or other promotional information may be desired and included on each coupon independent of the particular bargain for which the customer has sought a coupon.

As seen in FIG. 3, a typical video display screen 50 of a machine 10 used in a car washing business demonstrates the versatility of the machine 10 and the wide array of coupons which could be dispensed therewith. Some of the bargains could be redeemed within 24 hours from the time indicated thereon. Others may be redeemed on the day dispensed or only at some time in the future in order to require the customer to return to the car washing business. Still other coupons may be directed to particular products at the business location of the machine. Others might relate to business offers or bargains at other locations independent of the particular business which owns and operates the machine. The various types of coupons that could be dispensed by the preferred machine 10 appear to be almost endless.

All of these alternatives and others which may yet be devised, open up various opportunities for the machine owner to collect revenues from the machine itself and from increased business generated by the use of the coupons. Additionally, if a particular bargain directed to return business does not appear to be sufficiently attractive to cause customers to purchase a coupon, the owner can change the amount of money required for the coupon or the amount of savings upon redemption. The preferred control means 30 has such a flexability that it enables small businesses to experiment and device all types of coupons to insure satisfactory results. Still further, the preferred coupon dispensing machine 10 enables the owner to devise coupons for the benefit of others who may in turn pay the owner to offer the goods or services on their behalf. For example, the manufacturer of a product for which a coupon is issued may pay the owner the face value of the savings offered to the customer in a manner which is similar to the present redemption policy of many large manufacturing companies. In addition to the flexability and alternative sources of income the preferred coupon dispensing machine offers, it is expected that the resulting use by customers will be significantly greater than any other coupon system previously employed. A coupon system established by the preferred coupon dispensing machine 10 does not require a customer to scan, read or collect coupons from various publications or magazines or to save those which are directly sent through the mail. A decision regarding coupons and related savings can be made upon each visit to the location of the machine. If the customer is not interested, no coupon will be printed or dispensed. If the customer is interested, some money is required to obtain the coupon so that the customer will be much more inclined to actually redeem the coupon to the benefit of the manufacturer or business offering the promotion or bargain. Similarly, if the benefit can only be obtained at some later date, since the customer must include some money for the receipt of the coupon, redemption is again much more likely.

As seen in FIG. 4, after the customer has read and examined the particular bargains being offered in the machine 10, the particular selection can be made by proper use of the selection means 22 in accordance with the operating instructions 26. As mentioned above, with a properly configured control means 30, the owner of the machine would also utilize the selection buttons 24 for the creation and selection of the various bargains including the cost and the amount of savings that the coupons will provide.

As seen in FIG. 5, a typical coupon 52 will include preprinted information 54 thereon tending to identify the coupon to prevent counterfeiting and/or misplacement by the customer. Additionally, some standard inscription 56 will be printed on all coupons to establish the location of the source of the coupon or other information helpful to the customer independent of the particular bargain being sought. Finally, the particular inscription 58 is directed to the bargain being sought by the customer to insure that redemption will be for the product or service actually being sought.

Clearly other alternatives to the preferred machine 10 can be made without departing from the invention as disclosed and claimed. For example, while the preferred machine 10 employs a coin slot 18 and collection box 20 configuration, a bill acceptor unit, which is also well known in the art, could be employed.

Finally, while the discussion above regarding the preferred machine 10 is primarily directed to the use by an owner in the owner's place of business, other possible uses may also be developed. For example, an owner or operator of a mall may install a large number of similar machines in the common area for access to all mall users. The machines may be operated for the benefit of various businesses located in the mall so that potential customers may conveniently check to determine possible bargains without requiring an initial trip to each business. With a proper selection of bargains, a general visitor to the mall may be encouraged to specifically visit any number of businesses to the benefit of both the businesses and the mall in general.

Figure 6:
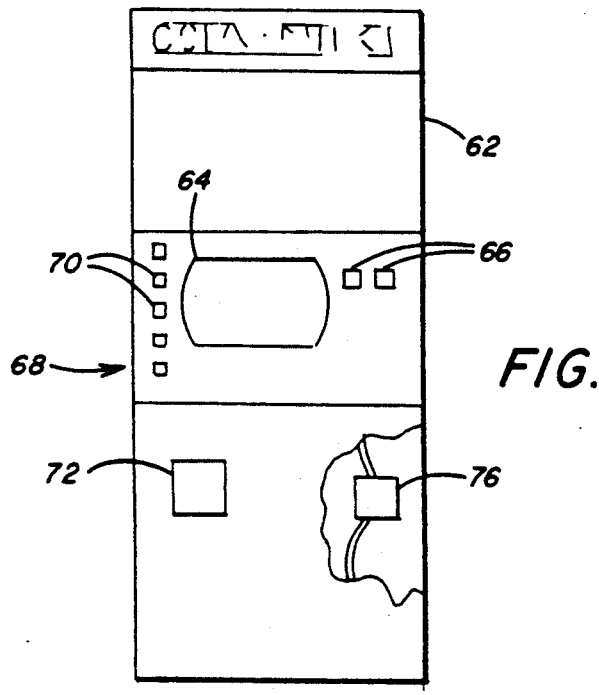
FIG. 6 is a front elevational view of an alternative machine for dispensing coupons including various features of the invention.

In this regard, an alternative machine is shown in FIG. 6 to include additional features which are appropriate for use in a mall or the like, and to better insure that potential customers can determine what bargins are being offered. The machine 60 includes a cabinet 62 which is again of the type to be mounted on the floor. The cabinet 62 includes a display means preferably in the form of a video display screen 64 which can be utilized to indicate the various bargains or promotions to be offered and additional information about the coupons therefor. The cabinet 62 also includes a currency deposit means in the form of coin slots 66.

The actual selection of a desired bargain and respective coupon from the machine 60 is somewhat simplified from that required for the machine 10. In order to make a selection, a potential customer simply deposits the correct number and amount of coins in the slots 66. A selection means 68 for the machine 60 includes an array of buttons 70 which are numbered to represent the specific bargains being offered. After the appropriate coins are deposited and verified, the customer may simply push the appropriate button 70 for the selection of the desired bargain. The machine 60 will then dispense a coupon from the cabinet 62 at the coupon discharge 72.

The preferred machine 60 includes the additional display means in the form of a "walking" or moving lighted sign configuration 74 at the upper region of the cabinet 62. Such a "walking" light configuration can be programmed by additional programming or control means 76 within the cabinet 62 for displaying information regarding the store or facility at which the coupons may be redeemed if the machine is located in a central mall area. Alternatively, the "walking" sign can be used to indicate generally the type of bargains which are being offered in the machine 60. For example, if the bargain were to be directed to a particular brand of cola and a particular bottle configuration for the cola, the display means 74 may be programmed to simply indicate the cola brand name which is generally being offered in the machine 60. As a result, the display means 74 is capable of being seen from a greater distance remote from the machine 60 to generally attract customers to come to the machine 60 for an analysis of the specific bargains being offered. Still further, since the display means 74 is located at the upper region of the cabinet 62, potential customers can generally determine what bargains are possible even if someone is presently using the machine 60.

As mentioned above, since such machines might also be used in malls, the use of the display means 74 to indicate which stores or facilities are included in the machine 60 will enable potential customers to clearly see which machines may be of interest and which facilities may be offering coupons.

The additional control means 76 within the cabinet 62 for determining which messages will be displayed on the display means 74 is independent of the control means for the entire coupon system discussed for the machine 10. Such a control means 76 provides greater flexibility for the operator of the machine or the various store owners who wish to provide coupons thereby.

The machine 60 would include the control means, storage means, dispensing means, and printing means in a similar manner as the machine 10 discussed hereinabove. The means for programming the bargains of the machine 60 might be located within the cabinet 62 and include a keyboard for proper selection or alteration of the bargains.

The display means 74 may be of a type sold by TL-1 Moving Message Display located at 4120 Birch Street, Newport Beach, Calif. 92660. The Model TL-1 Moving Message Display allows the programmed letters or words to be sequentially moved across the screen, up the screen, or in some other alternative form.

Figure 7:
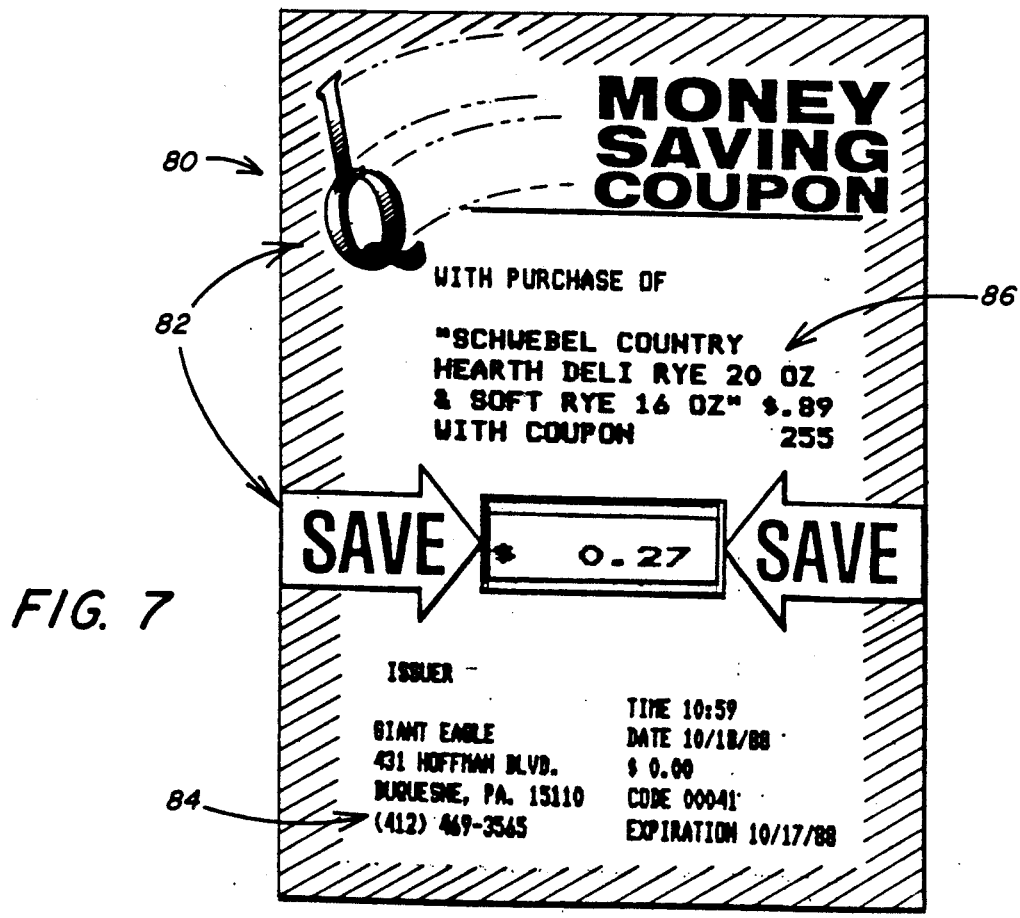
FIG. 7 is a view of one possible coupon which can be dispensed from the machine of FIG. 6.

As seen in FIG. 7, a typical coupon 80 to be dispensed by the machine 60 would include pre-printed information 82 thereon tending to identify the coupon to prevent counterfeiting and/or misplacement by the customer. Additionally, some standard inscription 84 will be printed on all coupons to establish the location of the source of the coupon and other information helpful to the customer independent of the particular bargain being sought. Finally, a particular inscription 86 is directed to the bargain being sought by the customer to insure that redemption will be for the product or service actually being sought.

As thus described, the machine 10 includes additional features to enable potential customers to more readily see which companies are offering bargains and/or which products or services are the subject of the bargains. Further, this information is available to potential customers at a remote location from the machine and may be sufficient to direct a potential customer to the machine even if others are presently using the machine.

What is claimed is:

1. A machine for selectively producing and dispensing a desired one of at least two coupons respectively including at least two different inscriptions thereon to be respectively redeemable for at least two different bargains, said machine comprising:

a cabinet;

control means in said cabinet;

a video display screen on said cabinet;

said video display screen being controlled by said control means to display specific bargain information indicating said different bargains capable of being acquired by redemption of respective said coupons and a specific amount of currency required to obtain each of said respective coupons;

selection means mounted on said cabinet for selecting said desired one of said different bargains and said respective coupon therefor;

currency deposit means in said cabinet for receiving various amounts of said currency;

means for storing a supply of paper for forming said coupons in said cabinet;

coupon dispensing means mounted in said cabinet in alignment with said supply of said paper stored therein and capable of dispensing each of said coupons to an exterior of said cabinet after production thereof;

said control means being capable of determining said desired one of said different bargains selected through said selection means and that said specific amount of said currency for said desired one of said different bargains as selected has been deposited in said currency deposit means and then causing said coupon dispensing means to dispense said respective coupon for said desired one of said different bargains;

said control means including means for altering said different bargains and said respective coupons therefor which are capable of being produced and dispensed by said machine;

said coupon dispensing means including printing means operated by said control means to selectively print on said supply of said paper for forming each of said respective coupons with a respective one of said different inscriptions for said coupons;

said printing means for printing said respective one of said different inscriptions selected through said selection means; and said control means including selectable means for causing said printing means to print standard information independent of said bargain information as indicated on said video display screen on each said coupon being produced by and dispensed from said machine, whereby said desired one of said at least two coupons is only produced and dispensed by said machine after said selecting with said selection means and said printing by said printing means.

2. The machine as set forth in claim 1, wherein said means for altering said different bargains includes independent means for altering said specific amount of said currency required for each said respective coupon.

3. The machine as set forth in claim 1, wherein said supply of paper includes portions of a surface thereof which are pre-printed to include said portions in identical form for all said coupons.

4. The machine as set forth in claim 1, wherein said standard information includes time information and said control means includes timing means to cause said printing means to print said time information on each said coupon produced by and dispensed from said machine.

5. The machine as set forth in claim 1, further including additional display means on said cabinet independent of said video display screen and additional control means in said cabinet for selective alteration of additional information to be seen on said additional display means, wherein said additional display means is disposed at a top region of said cabinet for being seen from a distance remote from said cabinet; said additional display means includes said additional information being provided in a sequential form; and said additional display means includes said additional information in said sequential form independently of said selection means, said currency deposit means and said coupon dispensing means.

6. The machine as set forth in claim 1, wherein said specific bargain information displayed by said video display screen is different from said respective one of said different inscriptions and said standard information which are printed by said printing means.

7. The machine as set forth in claim 6, wherein said specific bargain information includes a simultaneous display of said different bargains on said video display screen.

8. A method of selectively producing and dispensing a desired one of at least two coupons respectively including at least two different inscriptions thereon to be respectively redeemable for at least two different bargains, which said method comprises the steps of:
 displaying bargain information on a video display screen including an indication of said different bargains and each respective said coupon thereof;
 selecting said desired one of said respective coupons;
 printing at least a corresponding inscription of said different inscriptions on said selected one of said respective coupons;
 said printing including standard inscription on all said coupons which said standard inscription is in addition to said corresponding inscription and independent of said displaying of said bargain information on said video display screen.
 said printing of said corresponding inscription and said standard inscription being performed after said selecting;
 dispensing said desired one of said respective coupons with said corresponding inscription thereon after said printing said at least said corresponding inscription and said standard inscription; and
 said displaying and said printing being performed by selective programming means for establishing of each of said different bargains for. which said respective coupons can be redeemed.

9. The method of selectively producing and dispensing said selected one of said respective coupons as recited in claim 8, wherein said step of displaying also includes an indication of an amount of currency required for said selected one of said respective coupons and said step of selecting includes depositing said amount of currency in said machine.

10. The method of selectively producing and dispensing said selected one of said respective coupons as recited in claim 8, including the step of selective programming said selective programming means for establishing said standard inscription for said step of printing.

11. The method of selectively producing and dispensing said selected one of said respective coupons as recited in claim 8, including the step of additional displaying of additional information regarding said bargains which said additional information is unaltered by and independent of said displaying, said selecting, said printing, and said dispensing.

12. The method of selectively producing and dispensing said selected one of said respective coupons as recited in claim 11, including the step of selectively altering said additional information for said additional displaying.

13. The method of selectively producing and dispensing said selected one of said respective coupons as recited in claim 8, including the step of selectively altering said displaying and said printing through said selective programming means for altering said different bargains.

14. A machine for selectively producing and dispensing a desired one of at least two coupons respectively including at least two different inscriptions thereon to be respectively redeemable for at least two different bargains, said machine comprising:
 a cabinet;
 control means in said cabinet;
 a video display screen on said cabinet controlled by said control means to display bargain information about said different bargains capable of being acquired by redemption of respective said coupons;
 selection means mounted on said cabinet for selecting said desired one of said different bargains and said respective coupon therefor;
 means for storing a supply of paper in said cabinet;
 coupon dispensing means mounted in said cabinet in alignment with said supply of said paper and capable of dispensing each of said coupons after said producing thereof to an exterior of said cabinet;
 control means in said cabinet capable of determining said desired one of said different bargains selected through said selection means and then causing said coupon dispensing means to dispense said respective coupon for said desired one of said different bargains;
 said coupon dispensing means including printing means operated by said control means to selectively print on said paper of said supply each of said respective coupons with a selected one of said different inscriptions for said desired one of said respective coupons corresponding with said desired one of said bargains selected through said selection means;
 said control means including selectable means for causing said printing means to print standard information on each of said respective coupon being produced by and dispensed from said machine; and
 said standard information being different from and independent of said bargain information displayed on said video display screen.

15. The machine as set forth in claim 14, wherein said control means includes means for altering said different bargains and said respective coupons therefor which are capable of being produced by and dispensed from said machine.

16. The machine as set forth in claim 14, wherein said paper includes pre-printed information thereon and said pre-printed information is included on said each of said respective coupons produced by and dispensed from said machine.

17. The machine as set forth in claim 14, wherein said video display screen displays a specific amount of currency required to obtain each of said respective coupons, said selection means includes currency deposit means for receiving various amounts of said currency, and said control means is capable of determining that said specific amount of said currency for said desired one of said different bargains as selected has been deposited in said currency deposit means prior to said producing and said dispensing of said respective coupon.

18. The machine as set forth in claim 14, further including additional display means on said cabinet independent of said video display screen and additional control means in said cabinet for selective alteration of additional information to be displayed on said additional display means, wherein said additional information is displayed on said additional display means independently of said selection means and said coupon dispensing means.

* * * * *